No. 727,916. PATENTED MAY 12, 1903.
R. W. DULL.
PULLEY.
APPLICATION FILED NOV. 3, 1902.
NO MODEL.
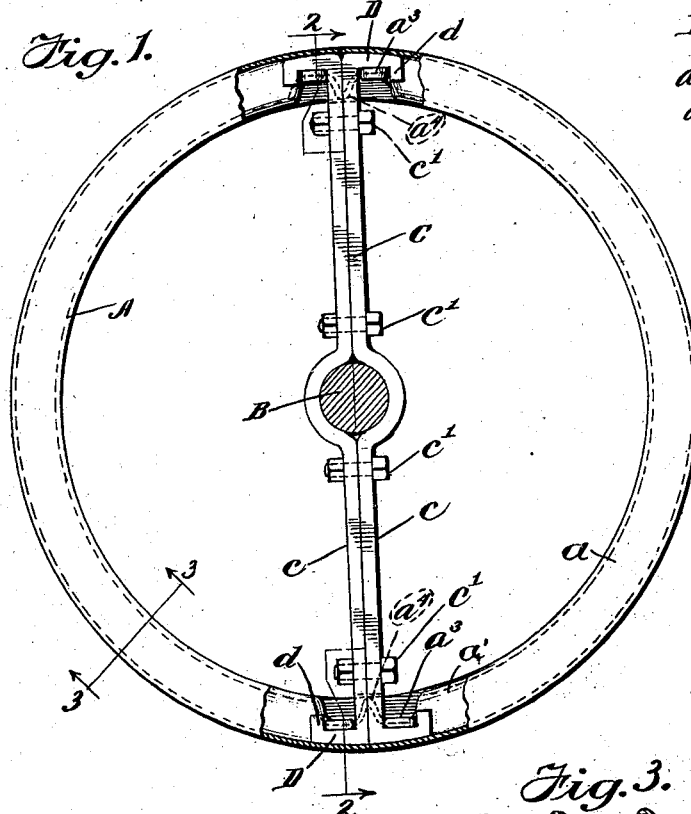
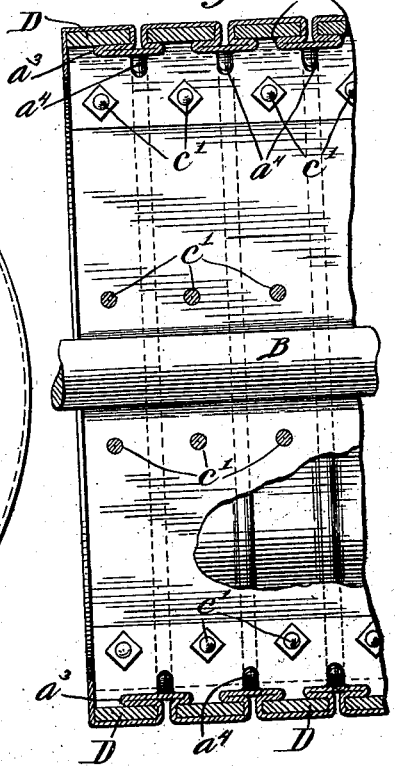
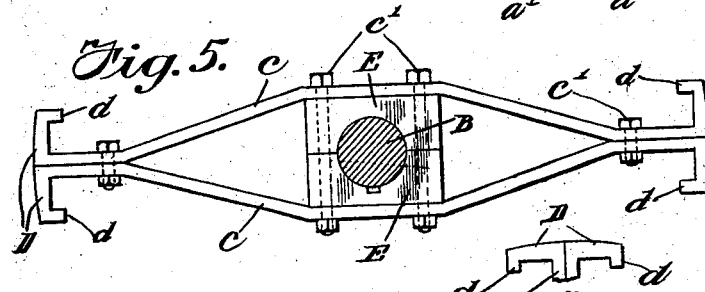
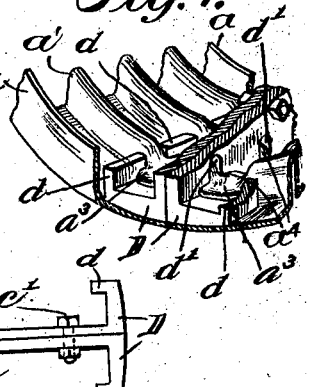
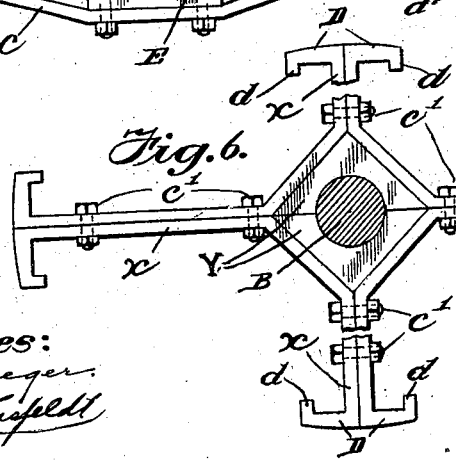
Witnesses:
Inventor:
Raymond W. Dull
by Arthur F. Durand
Atty No. 727,916.                                    Patented May 12, 1903.

UNITED STATES PATENT OFFICE.

RAYMOND W. DULL, OF CHICAGO, ILLINOIS.

PULLEY.

SPECIFICATION forming part of Letters Patent No. 727,916, dated May 12, 1903.

Application filed November 3, 1902. Serial No. 129,905. (No model.)

*To all whom it may concern:*

Be it known that I, RAYMOND W. DULL, a citizen of the United States of America, and a resident of Chicago, Cook county, Illinois, have invented a certain new and useful Improvement in Pulleys, of which the following is a specification.

My invention relates to pulleys for use in the transmission of power by belting from one shaft to another, and relates more particularly to that type ordinarily known as a "split" pulley—that is to say, a pulley in which the hub or central portion which clamps upon the shaft is made in two or more parts, whereby the pulley as a whole may be easily and readily applied to a shaft or removed therefrom.

Generally stated, the object of my invention is to provide a highly-efficient and at the same time economical construction of pulley.

A particular object is to provide a construction which will materially increase the strength and decrease the weight of the pulley.

Another object is to provide a construction which will permit the pulley to be composed mainly of sheet metal pressed out or bent into the proper shape, thereby rendering the pulley easy of manufacture and also practically incapable of fracture while under the influence of centrifugal force.

Another object is to provide a construction and arrangement by which the sheet metal may be practically doubled upon itself, so as to render the pulley as a whole very stiff and rigid.

These and other objects will from the following description be readily apparent to those skilled in the art.

In the accompanying drawings, Figure 1 is a side elevation of a pulley embodying the principles of my invention, certain parts being broken away for the purpose of exposing the method of attaching the hub portion to the rim portion. Fig. 2 is a section on line 2 2 in Fig. 1. Fig. 3 is an enlarged section of the sheet-metal rim on line 3 3 in Fig. 1. Fig. 4 is a perspective of a portion of the pulley, illustrating the manner of connecting the sheet-metal rim with the spokes and hub portion of the pulley. Figs. 5 and 6 illustrate different forms or constructions of the spokes and hub portion of the pulley.

As thus illustrated, my invention comprises a rim A, which is preferably of sheet metal and which is in cross-section, preferably as shown in Fig. 3. This annular rim is preferably connected with the shaft B, upon which the rim is mounted, by means of a spoke-and-hub structure C. In Fig. 1 this spoke-and-hub structure consists of two flat plates $c$ $c$, clamped upon the shaft by means of bolts $c'$ and constructed or formed with feet or end portions D. These feet or end portions which engage the annular rim of the pulley can be provided with upturned flanges or edge portions $d$ and also with notches or recesses $d'$, extending entirely across and through the ends of the two plates $c$ $c$. Now with this arrangement the annular rim of the pulley can be formed with annular flanges $a$ at the sides and also with intermediate inwardly-projecting flanges $a'$. These intermediate flanges are, it will be seen, formed by folding or doubling the sheet metal back upon itself, so as to provide each intermediate flange with a circumferentially-extending annular recess $a^2$. With this provision the periphery of the pulley-rim is provided with a plurality of annular grooves or recesses which permit the escape of air from beneath the belt. Now in order to fasten the ends of the spokes or split hub portions of the pulley to the rim the intermediate flanges $a'$ can be flattened down at each side of the recesses $d'$, so as to provide flattened portions $a^3$, as shown in Figs. 1, 4, and 2. These flattened portions prevent relative rotation between the rim and hub portions of the pulley, as each flattened portion serves, in effect, as a key to prevent relative rotation between the rim and hub and other central portions of the pulley. It will be observed that these intermediate flanges or stiff ribs $a'$ are only flattened at each side of the meeting portions of the plates $c$ $c$ and are consequently left with the small projections $a^4$ between the two flattened portions $a^3$. Thus the plates which are clamped upon the shaft are not only prevented from rotating or turning relatively to the sheet-metal rim, but also are prevented from having an endwise shift or movement relatively to the sectional sheet-metal rim. In other words, the sheet-metal rim of the pulley can neither turn or rotate upon the plates which constitute the central portion of the pulley nor slide upon these plates in a direction parallel with the shaft, and this stiffness, rigidity, and firmness of construction is all obtained, it will be seen, without the use of bolts or fastening devices other than those for clamping the two plates upon the shaft.

In Figs. 5 and 6 I have illustrated two different ways of making the pulley applicable to shafts of different diameters. In Fig. 5 the construction is substantially the same as in Fig. 1, with the exception that the two plates $c$ $c$ are bent apart at their middle portions, so as to provide space or room for the clamping-blocks E. These blocks can of course be made with concave recesses of different sizes, so as to make the pulley fit a shaft of any given diameter. In Fig. 6 the construction is substantially the same as in Fig. 5, with the exception that in the structure X four Y-plates are employed rather than two. With this arrangement the pulley will have four spokes, so to speak, instead of two, and at this juncture it will be readily understood that the pulley can have either two spokes or four, as shown in Figs. 1 and 6, for example, and as the conditions of any particular case may require.

From the foregoing it will be seen that I provide a split pulley which is both strong and durable and, in addition, economical to manufacture. As illustrated, it is composed simply of a pressed sheet-metal rim and of centrally-disposed metal plates, which latter serve as the hub-and-spoke structure to connect the rim with the shaft.

The formation of the flanges $a'$ is such that they provide the pulley with a smooth cylindric surface having a number of annular grooves through which the air can escape from beneath the flat belt. Furthermore, the center and rim portions of the pulley are secured together without the use of screws, nuts, or like fastening devices. Preferably this is accomplished by employing keys which are integral with the rim. As explained, these keys consist of the mashed or flattened portions $a^3$ of the intermediate flanges. Thus the sheet-metal rim is not only of a character to provide the extent of surface requisite for preventing the belt from slipping, but is also of a character to prevent the air from accumulating or from becoming compressed between the belt and the pulley—that is to say, to such an extent as would be likely to throw the belt from the pulley. This constant escape of the air through the grooves $a^2$ is of considerable importance, particularly in the case of a very wide belt, and by flat periphery it will of course be understood that I mean a periphery which is flat or practically flat in cross-section. In other words, the rim of the pulley is cylindrical or practically cylindrical in form.

What I claim as my invention is—

1. In a split pulley, the combination of a split center with a sheet-metal rim having inwardly-projecting marginal and intermediate strengthening-flanges, said flanges being so formed as to provide the pulley with a periphery adapted to receive a flat belt.

2. In a split pulley, the combination of a split or divided center, and a sheet-metal rim having strengthening-flanges forming peripherally-extending grooves, said grooves serving to permit the air to escape from beneath the belt, said flanges and grooves being so formed as to provide the pulley with a periphery adapted to receive a flat belt.

3. In a pulley, the combination of a split center having end portions provided with recesses, and a sheet-metal rim having strengthening-flanges, said flanges extending into said recesses, and certain portions of said flanges being pressed down upon the said split center, so as to prevent relative movement between the latter and the said sheet-metal rim.

4. In a split pulley, the combination of a split center and a sheet-metal rim having inwardly-projecting strengthening-flanges, each of said flanges being provided with an annular groove permitting the air to escape from beneath the belt, and each flange being arranged to extend through a recess in said split center, so as to prevent the rim from being displaced laterally upon the said center.

5. In a split pulley, the combination of a split center and a sheet-metal rim secured to said center by keys formed integral with said rim, said keys constituting the sole means for preventing relative rotation between the center and rim.

6. A split pulley comprising a split center consisting of flat metal plates clamped together and adapted to present radially-disposed end portions, and an annular sheet-metal rim having inwardly-projecting annular stiffening-flanges, said rim being secured to said end portions of the split center by pressing out certain portions of said flanges.

7. A split pulley comprising a sheet-metal rim composed of arc-shaped sections, a split center composed of a number of metal plates, each secured to one of said arc-shaped rim-sections, said sheet-metal rim being provided with inwardly-projecting annular flanges, each flange forming a peripherally-extending groove adapted to permit the air to escape from beneath a flat belt, and the said flanges and grooves being so formed as to in effect provide the pulley with a smooth peripheral surface adapted to receive a flat belt.

8. A split pulley having a sheet-metal rim constructed with a number of hollow flanges adapted to provide the pulley with a smooth peripheral surface adapted to receive a flat belt and having a number of circumferentially-extending grooves through which the air can escape from beneath a flat belt.

9. In a split pulley in which the center and rim are composed of a plurality of sections, and in which the center portions are firmly secured to the rim portions, the combination of a split center and a sectional rim, the said rim and center portions being secured together by keys formed integral with said rim portions, said keys constituting the sole means of securing the rim and center together.

10. In a split pulley, the combination of a center and a rim secured against relative rotation by keys formed integral with said rim, said keys constituting the sole means of securing said rim and center together.

11. A split pulley comprising a split center and a sectional sheet-metal rim, said rim being formed with inwardly-projecting annular hollow flanges, said flanges thereby being adapted to provide the cylindric and smooth peripheral surface of the pulley with a number of annular grooves through which the air can escape from beneath the flat belt, and said center and rim being secured against relative rotation by keys formed integral with said rim, said keys consisting of mashed portions of said flanges.

12. In a split pulley, the combination of a split center and a sheet-metal rim composed of arc-shaped sections, said arc-shaped sections having integral portions constituting the sole means for securing the rim and center together.

13. In a split pulley, the combination of a divided center and a sheet-metal rim composed of arc-shaped sections, said rim being provided with inwardly-projecting strengthening-flanges providing the outer surface of the rim with annular grooves through which the air can escape from beneath a flat belt, the periphery of the pulley being adapted to receive a flat belt, and the said arc-shaped sections having integral portions engaging the center and constituting the sole means for securing the rim and center together.

Signed by me at Chicago, Cook county, Illinois, this 13th day of October, 1902.

RAYMOND W. DULL.

Witnesses:
  HARRY P. BAUMGARTNER,
  THOS. A. HARDERS.